United States Patent [19]

Meltsch et al.

[11] 4,438,294
[45] Mar. 20, 1984

[54] CABLE SLEEVE WITH AN ENTRANCE SOCKET OF SHRINKABLE MATERIAL

[75] Inventors: Hans J. Meltsch, Germering; Jan Rost, Traubing, both of Fed. Rep. of Germany

[73] Assignee: Siemens Aktiengesellschaft, Berlin & Munich, Fed. Rep. of Germany

[21] Appl. No.: 337,295

[22] Filed: Jan. 5, 1982

[30] Foreign Application Priority Data

Feb. 11, 1981 [DE] Fed. Rep. of Germany ....... 3104916
Jul. 1, 1981 [EP] European Pat. Off. ........ 81105109.3

[51] Int. Cl.³ .......................................... H02G 15/04
[52] U.S. Cl. .................................. 174/88 R; 174/93; 174/DIG. 8
[58] Field of Search ........... 174/88 R, 92, 93, DIG. 8

[56] References Cited

U.S. PATENT DOCUMENTS

| | | | |
|---|---|---|---|
| 2,027,962 | 1/1936 | Currie | 264/230 |
| 3,086,242 | 4/1963 | Cook | 264/209.1 |
| 4,002,818 | 1/1977 | Kunze | 174/92 X |
| 4,095,044 | 6/1978 | Horsma et al. | 174/138 |
| 4,135,587 | 1/1979 | Diaz | 174/92 |
| 4,181,775 | 1/1980 | Corke | 174/DIG. 8 X |
| 4,195,106 | 3/1980 | Brusselmans | 174/DIG. 8 X |
| 4,203,000 | 5/1980 | Muller . | |
| 4,350,842 | 9/1982 | Nolf | 174/DIG. 8 X |
| 4,361,722 | 11/1982 | Kunze et al. | 174/93 |

FOREIGN PATENT DOCUMENTS

| | | |
|---|---|---|
| 35179 | 9/1981 | European Pat. Off. . |
| 2209629 | 11/1978 | Fed. Rep. of Germany . |
| 3029848 | 2/1981 | Fed. Rep. of Germany . |
| 7721933 | 3/1981 | Fed. Rep. of Germany . |
| 2335078 | 7/1977 | France . |
| 2369712 | 5/1978 | France . |
| 2388432 | 11/1978 | France . |
| 1431167 | 5/1973 | United Kingdom ................ 174/93 |
| 2057202 | 3/1981 | United Kingdom . |

Primary Examiner—A. T. Grimley
Assistant Examiner—Morris H. Nimmo
Attorney, Agent, or Firm—Hill, Van Santen, Steadman & Simpson

[57] ABSTRACT

An improved sealing element for a cable entrance socket of a cable sleeve characterized by the element being a liner element of a thermoplastic, cross-linked material having a shape memory and being shrinkable to a previous shape when subjected to a shrinking process. The liner element may be either a solid member or a cup-shaped hollow member and may have two or more axially extending, outwardly opening recesses for receiving cables.

40 Claims, 17 Drawing Figures

CABLE SLEEVE WITH AN ENTRANCE SOCKET OF SHRINKABLE MATERIAL

BACKGROUND OF THE INVENTION

The present invention is directed to a cable sleeve, which has a longitudinally extending joint and has a cable entrance socket at each end of the sleeve either as a part of the sleeve or in a separate element assembled with the sleeve. The cable entrance socket, which is of a shrinkable material, receives a liner element having an axis and external axially extending recesses for receiving portions of cables being introduced into the cable entrance socket. The socket also receives a sealing material for forming a seal between the socket and the sheath of the cable, which is engaged by the cable entrance socket.

An arrangement for providing a gas-tight and moisture-tight introduction of electrical cables into a longitudinally divided cable sleeve, which arrangement includes an entrance socket that receives elastic or preferably cut plastic adhesive sealing material disposed between spaced gaskets to limit the sealing space between the cable sheaths and the cable sleeve, is illustrated in German Auslegeschrift 22 09 629. In the device of the German patent, the sealing material exhibits the form of a preshaped disk-shaped liner element or member filling the sealing space so that the liner element exhibits at least two recesses extending along the circumference for receiving cables to be sealed in the socket. These liner elements can, for example, also consist of core pieces on which sealing materials are applied. A disadvantage of such a liner element, however, is that it can only be adapted to a small range of cable diameters. Thus, an adaption can only be accomplished by means of inserts consisting of sealing material which have various thicknesses. When the liner element is shaped of sealing material, a final deformation equilibrium can hardly be achieved under certain conditions. However, when using liner elements with a core piece and sealing material on a surface the adaptability is limited since the core piece retains its rigid shape.

SUMMARY OF THE INVENTION

The present invention is directed to providing a cable sleeve having a shrinkable cable acceptance socket or part which receives a liner element for filling a portion of the space between the introduced cables and the socket. The arrangement of the present invention after the treatment of the shrinkable socket enables an optimal dimension for the sealing material which is required between the sheaths of the cables, the socket and the liner element.

This object is achieved by an improvement in a cable sleeve having a longitudinally extending joint and a cable entrance socket at each end of the sleeve, said cable entrance socket consisting of a shrinkable material and receiving a liner element having an axis and having external axially extending recesses for receiving portions of the cable being introduced into the cable entrance socket and said socket having sealing material for forming a seal between the socket and the sheath of the cable engaged by the cable entrance socket. The improvements comprise a liner element consisting of a thermoplastic, cross-linked material, said element having a shape memory and being shrinkable toward a previous shape when subjected to a shrinking process such as a heat shrinking process.

The cable entrance socket of the cable sleeve according to the present invention may consist of either a longitudinally divided socket or a continuous socket. The sockets are provided with the liner elements which after the thermal treatment are optimally adapted to the introduced cables and finally either produce the sufficient sealing or cooperation with a suitable sealing material. Advantages of this arrangement can be seen by the fact that the cables can be inserted and mounted in the cable entrance area in a simple manner and that the liner element will adapt to the cable as well as to the entrance socket simultaneously with the shinking of the socket. The liner element consists of a cross-linked thermoplastic material and exhibits a shape memory. Thus it can be forceably subjected to a deformation and this liner element will only resume its original or previous shape when heat is applied. Thus, the original shape is selected in such a manner that it will tightly surround the inserted cables when the element is reformed back into or toward its original or previous shape and thus automatically reduces the required adaptation. Since corresponding sealing materials for example, plastic sealing compounds or meltable adhesives, which react at the shrinkage temperature, are introduced into the joints and on the surfaces of the various elements, the necessary sealing ensures simultaneously with the shrinking process.

An example of the liner element is a hollow element having at least one side wall extending in the axial direction and being interconnected by a transverse terminating wall extending substantially at a right angle to the axial direction to form at least one cup shape cavity. For example, the transverse terminating wall can be disposed between the ends of the side walls of the elements so that a pair of cup-shaped cavities are provided or can be disposed at one end so that only a single cup-shaped cavity is present. In either situation, the liner can be easily manufactured as a molded part. Either after manufacturing or during the manufacturing of the molded part, the material is exposed to a cross-linkage process whereby the cross-linkage can occur in a chemical manner or by means of a suitable irradiation. Subsequently, this molded part is converted from its basic shape into an assembly shape which is suitable for the insertion of the cables. This assembly shape can be achieved by means of suitable deformation, for example, by means of the stretching with appropriate tools. This essentially means that the assembly shape of the liner element should exhibit corresponding indentations or recesses in the various side walls which open outward and have a greater diameter than the diameter of the cable which will be introduced therein. After the insertion of the cables, the liner element with the cable is then subjected to a shrinkage operation such as by being exposed to heating so that the liner will attempt to return to the original or previous shape and thus tightly grasp each of the cables inserted in the recesses and hold them tightly against the interior surface of the entrance socket.

By means of selecting a design and assembly shape of each of the liner elements, a broad spectrum of uses can be obtained. For example, the number of cables which can be introduced into a given socket can be easily varied. If the assembly shape of the element is provided with lips adjacent the recesses which are tapering projections, a transition between the reformed liner element, cable and socket will be obtained without any gradations or steps. In addition, if the liner element has traverse side walls or stays, which extend between the side walls containing the recesses, a matching of the liner element in the shrunken form with both the socket and cables can be improved so that the danger of gaps being formed along, a common line of contact between the cable, the liner element and the socket is significantly reduced.

A good uniform heat distribution can be achieved with the liner elements of the present invention by means of utilizing a heat conducting or thermal conductive element. If the liner element is a substantially solid member such as formed of foam material, the thermal-conductive element may be embedded therein so that all of the locations inside of the liner element can obtain sufficient heating during the shrinking operation. If the liner element is a hollow element having axially extending side walls, and the transverse terminating wall, then a heat conducting element can be inserted into the cup-shaped liner to ensure sufficient heating of all portions thereof. In addition, a supporting body can be inserted in the cup-shaped liner and this supporting body besides increasing the mechanical stability of the liner can also act as a heat conducting element.

One of the advantages of the invention is that by a proper selection of the initial body, which is subsequently deformed into the assembly liner element having the shape memory, blind plugs or plugs are not necessary to fill those recesses which are not occupied by a cable. This is because the liner element during the shrinking operation will have the side wall with the recess returned to its original condition or shape automatically and coact to form a seal with the shrinking socket. However, if the provision of a plug is desired, it can be inserted in the selected recess at the same time as the cables are inserted in the other recesses prior to the shrinking operation.

While the material for both the entrance socket and for the liner element can be selected so that they shrink at substantially the same temperatures, an additional advantage can be achieved by selecting the materials to be different and to respond to different shrinking temperatures. Thus, for example the shrinking temperature of the material for the socket can be selected to be higher than the shrinking temperature for the material for the liner element or vice versa so that the shrinkage differs when heat is applied during the shrinking process. Depending upon the shape of the individual parts, optimum shrinking relationships can be achieved in this manner. Thus, for example, it may be desirable that the adaptation of the liner element to the cable should be achieved first and that the adaptation of an engagement of the entrance socket to the cables would then occur subsequently. However, the reverse case may also produce a particular arrangement, for example, if it is considered important that the fixing of the cables in the recesses of the liner element by the socket should occur before the recesses shrink to engage the cable therein.

While the liner element is preferably constructed to have a structure for coacting with the respective socket to ensure a tight sealing of the various cables therein, it is also possible to use a plurality of liner elements in each socket. Thus, the pair of liner elements can be aligned side by side so that one cable is engaged by two elements while the remaining cables are entrapped between the elements and the walls of the socket.

It is also possible that the transverse terminating wall, whether it is disposed at an end of the element to form a single cup-shaped cavity for each element or between the ends of the element to form a pair of cup-shaped cavities, may have an opening for receiving an element such as a valve which would allow applying pressure to the interior of the cable sleeve. The wall may also have an opening for receiving an electrical element and thus enables obtaining access to the interior of the sleeve.

DESCRIPTION OF THE PREFERRED EMBODIMENTS

Figure 1:
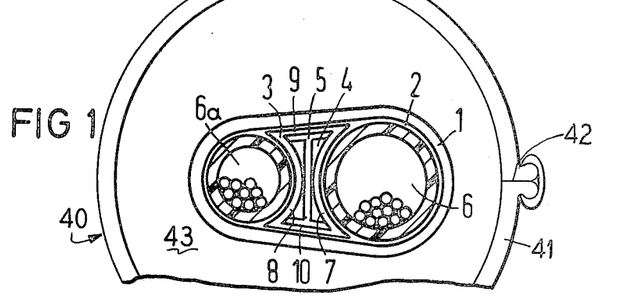
FIG. 1 is a partial end view of a cable sleeve with an entrance socket which socket receives a liner element in accordance with the present invention.
Figures 12, 13, 14:
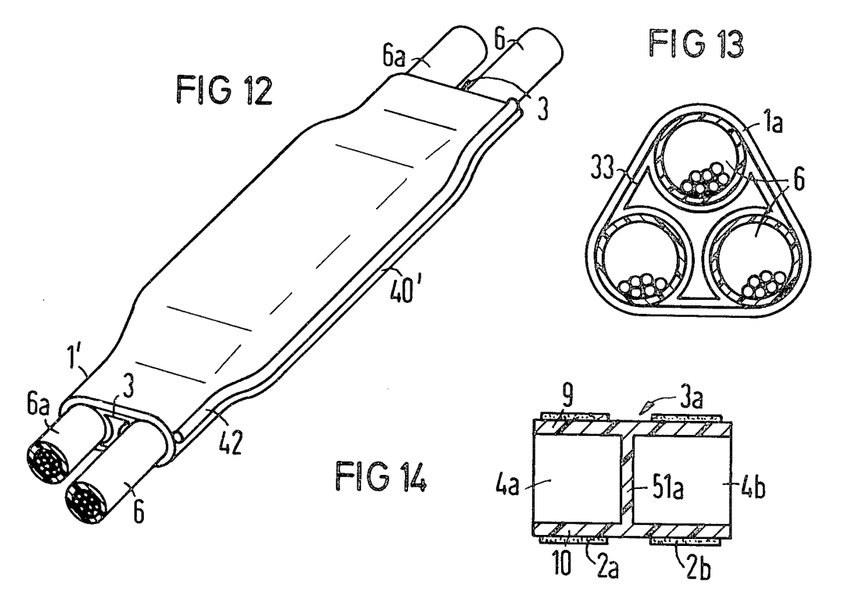
FIG. 12 is a perspective view of a cable sleeve with an integral socket at each end utilizing the liner element of the present invention.
FIG. 13 is an end view of socket with three cables.
FIG. 14 is a cross-sectional view of a modification of the liner element of FIG. 3.
Figure 17:
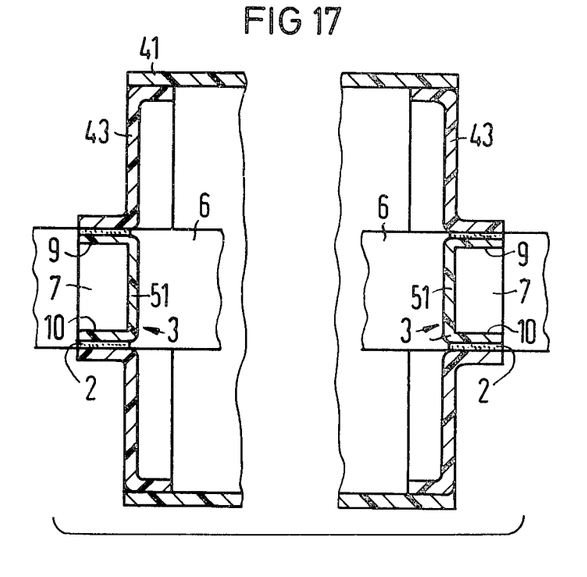
FIG. 17 is a longitudinal cross-sectional view of the liner element and cable sleeve of FIG. 1.

The principles of the present invention are particularly useful in a cable sleeve generally indicated at 40 and illustrated as a portion or member 41 having a longitudinal joint 42 which is wrapped on a head 43 at each end (see FIGS. 1 and 17). The head 43 has a cable entrance socket or tube 1 which is illustrated as being a continuous tube. It is noted, that the socket could also have a longitudinal joint if desired as illustrated by socket 1' of a cable sleeve 40' which has an integral socket (FIG. 12).

The socket or tube 1 receives a liner element 3 which is illustrated as a cross-sectional shape with a pair of side walls 7 and 8 which have a C-shaped profile and are interconnected by traverse side walls or stays 9 and 10 which are substantially planar. As illustrated, the side walls 7, 8, 9 and 10 form an approximate X-shape cavity 4, which receives a support body 5 which has a double T-shape or I shape cross-section and acts as a heat conducting element or body. The introduction of the support 5 increases the mechanical stability of the liner element 3 which preferably has a traverse extending wall such as the wall 51 (FIGS. 2 and 17) which closes off the hollow cavity receiving the support 5. The wall 51, which extends at right angles to the axis of the element, is preferably adjacent the end of the element 3 which will be near the inside of the cable sleeve 40 so that the cup-shaped opening 4 opens to the exterior. Thus, the cup-shaped opening or cavity 4 facilitates introducing heat to the entire structure of the liner element 3 during a heat shrinking process. The wall 51 can be spaced inward from the ends of the element as illustrated by wall 51a of element 3a (FIG. 14) which has opposite facing cavities 4a and 4b.

As illustrated, a pair of cables 6 and 6a are introduced into the sleeve or socket 1 and have a portion engaged in the recesses formed in the side walls 7 and 8. As illustrated in FIG. 1, the arrangement is in the final state, i.e. after the shrinking process of the socket 1 and the reforming of the liner element 3 towards its original shape so that the cable such as 6 and 6a are tightly received in the recesses of the side walls 7 and 8 and also engage interior wall portions of the socket 1. To ensure a tight seal between the sheath of the cable such as 6 and 6a, and the interior of the socket 1 as well as to the side wall 7 and 8, a sealing layer 2 of sealing material can be provided. The sealing material can consist of a thermoplastic or plastic sealing material. An employment of a meltable adhesive, which reacts approximately at the temperature for shrinking, can also be utilized. When a longitudinally socket has a longitudinally extending slot or joint, then an appropriate closing device will be provided along its longitudinal edge which must guarantee a secure seal in this area.

The introduction of the cables with different diameters, such as the smaller cable 6a relative to the cable 6, means that the liner element 3 when reverting to its original shape will move different amounts based on the particular size of the cable and result in a mutual inclination of the two traverse side walls 9 and 10 as illustrated. The socket 1 will have portions, which will match the inclination of the side walls 9 and 10, and the side wall 9 and 10 as well as those portions of the socket 1 extend substantially tangential to the surfaces of the two cables. This arrangement is particularly advantageous since during the shrinking operation, the parts will automatically adapt themselves to the particular sizes of the cable, which are inserted into the socket, to obtain the desired sealing of the surfaces therebetween. Under certain circumstances, a liner element may have traverse side walls which already exhibit the inclination towards one another while in the assembly shape prior to the step of shrinking and are adapted to received cables having different diameters.

Figure 2:
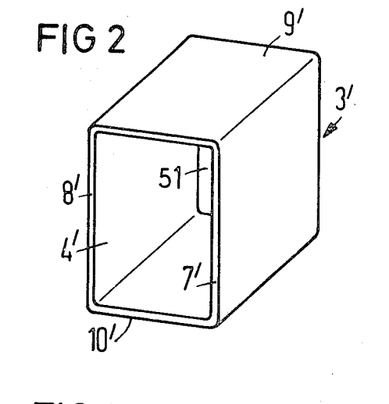
FIG. 2 is a perspective view of an initial part for manufacturing liner element in accordance with the present invention.
Figure 3:
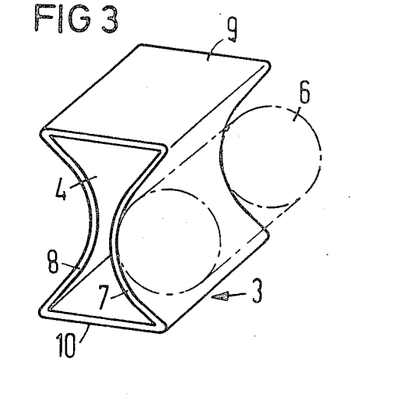
FIG. 3 is a perspective view of an assembly shape of the liner element formed from the part of FIG. 2.

To produce the liner element such as the element 3 in FIG. 1, an initial shape or part such as 3' illustrated in FIG. 2 is utilized. In this example, the initial shape 3' has a cup-shape with a rectangular cross-section with two lateral side walls 7' and 8' and two traverse side walls 9' and 10' as well as a back terminating wall 51. The combination of the back terminating wall 51 and the various side walls result in producing a rectangular cup-shaped cavity 4'. This initial part 3' can be manufactured in a simple manner such as by molding the part consisting of a thermoplastic material which is crossed-linked in the injection process. Subsequent, for example, in the course of further processing steps, the part 3' is reshaped into an assembly shape such as illustrated by the liner element 3 in FIG. 3. The reshaping is carried out by means of suitable tools and often requires stretching or deforming of the shape of the initial part 3' into the liner element 3. After the cooling process, the liner element 3 will have a shape memory and will revert towards the initial shape of the part 3' when subjected to a shrinking process such as the heat shrinking process. The shape of the liner element 3 of FIG. 3 is an assembly shape which coacts with the socket 1 to receive the cables such as 6 and 6a. As illustrated in FIG. 3, the assembly shape of the liner element 3 has the initial side walls 7' and 8' deformed into the side walls 7 and 8 which have a C-shaped profile with axially extending and outwardly opening recesses. Depending upon the diameter of the inserted cables, the side walls 7 and 8 during the shrinking operation will move back towards the original or initial shape to sealingly engage the sheaths of each of the cables. The two traverse side walls such as 9 and 10 will likewise change back to the original form to a lesser or greater degree. By inserting the element 3 into the socket 1 with the cup-shaped cavity 4 opening outward, it is possible that the application of the heat is applied evenly to the inside areas of the liner element 3 to ensure a uniform shrinking in a simple manner. The different sizes of the cables 6 and 6a shows that a large range of cable diameters can be received and covered with the recesses in the side wall 7 and 8 formed with a C-profile to open opposite one another.

Figures 4, 5:
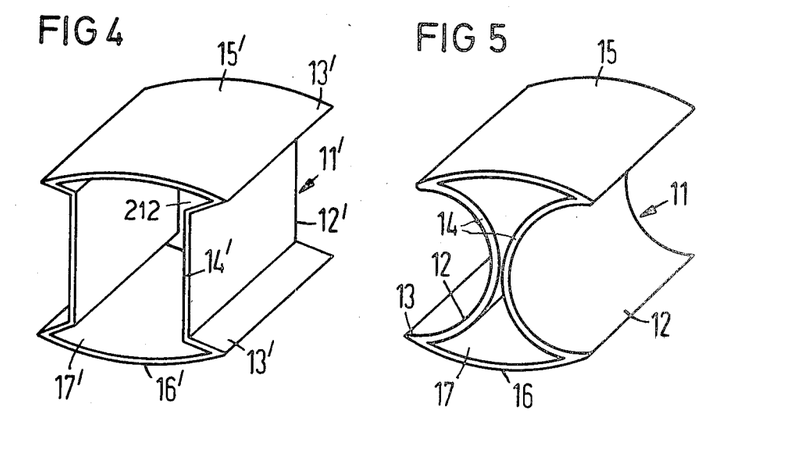
FIG. 4 is a perspective view of an embodiment of an initial part for manufacturing a liner element for use in the present invention.
FIG. 5 is a perspective view of an assembly shape of a liner element manufacture from the part illustrated in FIG. 4.

An embodiment of the liner element 11, is illustrated in FIG. 5 and has an assembly shape which has been produced from an initial or starting part 11' of FIG. 4 by means of a stretching operation. The liner element 11 has a pair of recesses 12, which are formed in a pair of opposite facing side walls 14 which have been deformed into C-shaped profiles opening opposite to each other. The two remaining two side walls 15 and 16 are traverse side walls which have an arcuate shape and extend between the edges of the side walls 14.

Since the traverse side walls 15 and 16 have arcuate shapes, a more uniform shrinkage of both the element 11 and the socket 1 during the shrinking process will occur. In addition, the edges of each of the recesses 12 have been formed with lips 13 which taper outward to form tapering projections. This provides a desirable transition along the contact line between the cable and the interior wall surfaces of the socket 1 which transition will be free of gradations and gaps and is hardly noticeable. This feature promotes the sealing of these transition areas to a very significant degree. The initial part 11' for the liner element 11 essentially has a rectangular cross-section with the side walls 14' being interconnected by the two traverse side walls 15' and 16' which already have the arcuate shape. The lips 13' are likewise provided at the corner of the initial part 11'. Each of the side walls 14' has a broad groove 12', which is formed by a substantially flat portion of the side wall 14' and a portion of each of the adjacent lips 13'. As a result of the stretching operation, the inside space or cavity 17' of the part 11' experiences a deformation and is reshaped into a cavity 17. The cavity 17' is closed at one end by a wall 212 which interconnects the side walls 14, 15 and 16.

Support bodies, which will increase the mechanical stability of the liner element, can be introduced into the inside space 17. However, these support bodies themselves should exhibit a certain elasticity and must be designed in such a manner that despite the supporting effect, the necessary deformation for the purpose of adapting the surfaces onto the cables is not inhibited. In addition, the support bodies can also serve as a heat conductor for the interior areas of the element 11.

Figure 6:
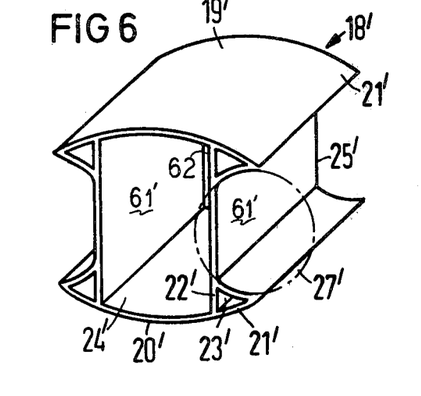
FIG. 6 is a perspective view of another embodiment of an initial part for manufacturing a liner element for use in the present invention.
Figure 7:
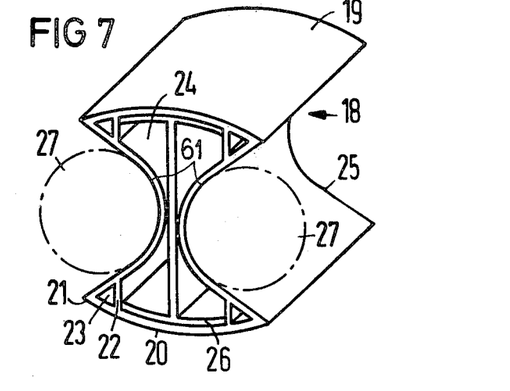
FIG. 7 is a perspective of an assembly shape of a liner element manufactured from the part illustrated in FIG. 6.

Another embodiment of the liner element is illustrated by the liner element 18 in FIG. 7 and is formed from an initial part 18' (FIG. 6). The initial part 18' has a substantially rectangular shape with a pair of side walls 61', 61' which are connected to traverse side walls 19' and 20' by lips 21' which are tapering projections. The ends of the side walls 61' and the traverse side walls 19' and 20', are interconnected by a terminating wall 62 to form a cavity 24'. As illustrated, the traverse side walls 19' and 21' have an arcuate shape and thus are curved surfaces. The coaction of the lips 21' and the side walls 61' forms a flat axially extending recess 25' for receiving a cable such as 27' illustrated in chained lines. As in the previous embodiments, the initial part 18' is deformed into the element 18 (FIG. 7) with side walls 61, 61 which have a C-shaped profile whose edges terminate in lips such as 21 and are interconnected by traverse side walls 19 and 20 for receiving a pair of cables such as 27. As illustrated in FIG. 6, each of the side walls 61' have extension forming braces or interior walls 22' which coact with the lips 21' to form tiny internal spaces 23'. The bracings 22' will remain as bracings 22 in the liner element 18 and improve the mechanical stability of the liner when subjected to the stresses during the shrinking operation. As can be seen, the lips 21, which extend outward from the bracing 22, will be more mobile and thus more deformable than the adjacent areas of the bracing 22 which extends more into the recess such as 25. Since significant forces can occur in this area, this improved rigidity is precisely desired for given cables 27 which have a relatively large diameter. In contrast thereto, the outer area close to the ends of the C-profile must remain easily adaptable. Thus, the danger of a lack of tightness in the common, critical contract areas is significantly reduced. Moreover, the two traverse side walls 19 and 20 are designed in an arcuate state and a double T-shaped support body such as 26 which is a heat conducting body is introduced in the inside cavity or space 24 of the element 18. To convert the initial part 18' into the liner element 18, the above mentioned manufacturing steps are applied on a molded body 18'.

Figure 8:
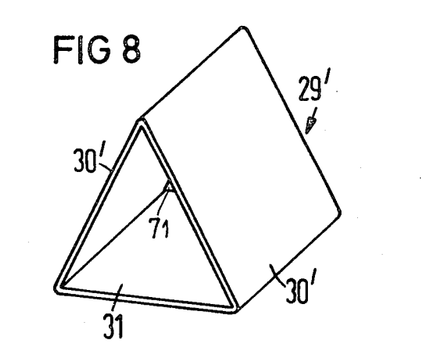
FIG. 8 is a perspective view of a stilled further embodiment of an initial part for use in manufacturing a liner element in accordance with the present invention.

In FIG. 8, an initial part 29' which is formed into a liner element 29 having a triangular configuration is illustrated. The liner such as 29 is utilized for insertion of three cables into a socket. The cup-shaped initial part 29' has a triangular cross-section with three side walls 30' interconnected by a terminal back wall 71 to form an inside cup-like space or cavity 31 and can be subsequently deformed into a liner element 29 of FIG. 9. The liner element 29 has each of the side walls 30' formed into recesses such as 30 due to a stretching process. In a simple construction, the edges between the side walls are designed without projection. After insertion of the cables and the following shrinkage operation, the liner element and the socket will adapt and conform to the configuration of the cables to provide a close seal. Given the use of recesses 30 for cables of different diameters, the shift in the center point 32 such as in FIG. 9 will occur for a liner such as 29. Due to the return of the liner element 29 towards its original structure, the necessary sealing will occur.

Figure 9:
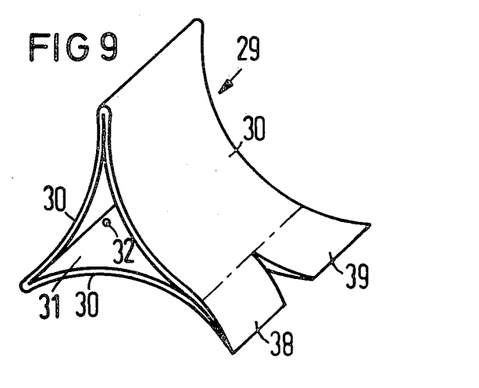
FIG. 9 is a perspective view of an assembly shape of a liner element with modifications produced from a part such as illustrated in FIG. 8.

An example is also illustrated in FIG. 9 in which at least one of the edges as indicated in dot-dash lines can have a particular good adaptation in a critical contact area by means of having lips such as 38 and 39 tapering therefrom. Since however, the adaptation must ensure along the edges in two directions, a division of the lips is necessary. This division for example is provided here in the center so that two identical lips 38 and 39 are provided. During assembly for example, the taper lip 38 will bend into the first adjacent recess such as 30 and the lip 39 will bend towards the second recess 30. For the sake of clarity, the lip formations are illustrated only along one edge in this Figure. By means of tapering the wall thickness moreover, a critical step formation is avoided in the contact between the lips and the interior of the socket.

Figure 10:
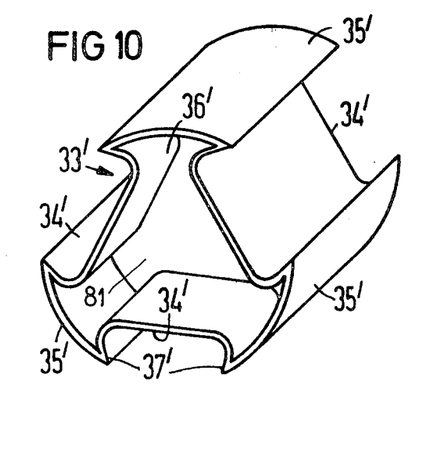
FIG. 10 is a perspective view of yet another embodiment of an initial part for use in manufacturing a liner element in accordance with the present invention.
Figure 11:
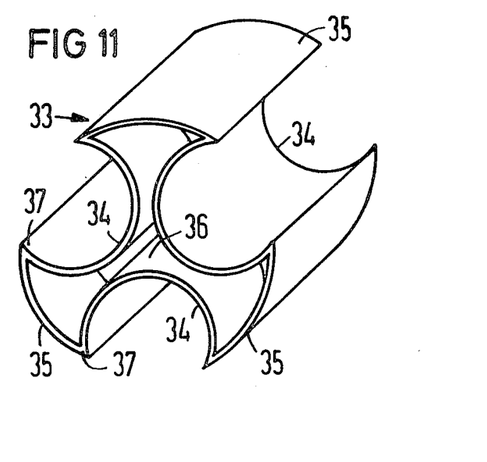
FIG. 11 is a perspective view of an assembly shape of a liner element manufactured from the part illustrated in FIG. 10.

Yet another embodiment of the liner element is shown by a liner element 33 in FIG. 11 which is constructed from an initial part 33' of FIG. 10. As in the previously discussed embodiment, the liner element 33 is designed for use with three cables which are inserted into a socket 1a (FIG. 13). Liner elements 33 has three arcuate side walls 34 forming axially extending outwardly opening recesses which are arranged in a star-like configuration and are interconnected by traverse side walls 35 which coact with the walls 34 to form tapering lips or projections 37 adjacent each of the recesses. The initial part 33' has side walls such as 34' which have a broad shallow recess molded therein. While the terminating wall may be provided adjacent one end of the part 33' it is illustrated as a terminating wall 81 which is midway between the two ends of the element 33' so that the element 33 will have a pair of cup-shaped cavities such as 36 which are opening in opposite directions similar to cavities 4a and 4b of FIG. 14. As in the previous embodiment, support bodies or elements can also be utilized in the cavity such as 36 to both facilitate stability and if made of a heat conducting substance to also aid in the conduction of heat to all of the areas of the element.

While the liner elements described hereinabove were hollow elements having cup-shaped cavities they could be a solid member such as a member of foam material in which corresponding support bodies or thermal-conductive materials have been introduced or embedded. In general, the material employed for all portions or part which are participating in the shrinkage operation, will be identical in shrinkage behavior with respect to the temperature. This however, is not absolutely necessary. Under certain conditions, materials with different heat shrinkage behaviors with respect to temperature can be employed for the different elements or members when a special effect is to be achieved. In the case of non-occupation of a recess, no special auxiliaries such as plugs are generally necessary. This is because the opening of the recess is automatically closed due to the return of the side wall or surface to the original shape during the shrinking operation and also due the shrinkage of the socket during the shrinking process. In the case of a very large recess, a dummy plug or welsh plug can be inserted so that the parts will form a tight seal therewith.

In the above description of the sample embodiments of the present invention, the adaptation of the members due to returning to the original shape has been discussed. However, the seals along the matched surfaces between the liner elements, the cables and the entrance sockets have not been discussed. Since this, however, occurs in the same manner in all instances, it can be considered in common by way of conclusion.

The sealing of the surfaces between the introduced cable sheaths, the liner elements and the surrounding socket will occur with suitable sealing materials which are uniformly distributed over the sealing surfaces. Thus, for example, plastic, adhesive sealing materials can be inserted as inserts or members and have the advantage that a certain compensation for irregularities will incur in the shrinking process. These inserts of sealing material can be applied both to the sealing surfaces of the recess as well as to the traverse side walls of the liner elements. Even more conducive to the assembly would be a meltable adhesive coating or layer on the outer surfaces of the recesses as well as on the traverse side walls. The meltable adhesive coating would only become effective during the introduction of heat during the shrinking process. Thus, the rather laborious steps of providing the coating during the assembly process can be eliminated. In special use cases, however, a combination of both sealing means is possible. Thus, an alternating arrangement of plastic sealing material and the meltable adhesive lying axially one behind the other along the axial direction of a liner element 3a as axially spaced layer 2a and 2b (FIG. 14) is particularly applicable. Given employment of meltable adhesives, a variation regarding different temperature behaviors of the shrinkage material and the adhesive material is additionally of interest under certain conditions such as when a mutual delay in the sequence in both the shrinking and the sealing process are desired.

Moreover, it should be noted that the principles of the present invention have only been explained on the basis of a few possible embodiments. Thus, it is submitted that the invention is not limited to the described embodiments.

A cable sleeve outlet for a spliced cable sleeve is also illustrated in German OS 30 29 848 which consists of an essentially cylindrical element with at least one re-entrant section formed from a channel in the longitudinal wall consisting of shrinkable material. A cable can be introduced into this re-entrant section or, respectively, into the channel. In addition, the cable sleeve outlet is provided with a fastening device which can be introduced into the end of the cylindrical element for the purpose of bridging and keeping the longitudinal opening closed. In the particular application of the device, the bridging section of the fastening device lies over the cross sectional surface at the ends and the fastening device is designed in such a manner that in its operation on the inside surface at least one part of the outer longitudinal wall of the cylindrical element is additionally rested on that part which is enveloped in the bridging closure. Thus the fastening device forms an essentially rigid inside support. Given such a sleeve outlet or sleeve head, it is a matter of a relatively rigid and rather unhandy structure which exhibits narrow slots in its longitudinal direction for the introduction of the cables through which slots the cables must he introduced into the introduction openings or, respectively, channels. Given rigid cables, this introduction is rather problematically, particularly when a plurality of cables must be introduced into a plurality of such cable introduction openings of a sleeve outlet. Thus, the cables must be well-fixed in their position, since only the re-entrant sections can adapt during the shrinkage to the introduced cable. Thus the surrounding entrance sockets are not able to cooperate in the adaptation in these areas due to the fastening elements which have been introduced and augmented to form rings. This, thus, means that the adaptation of the cables only occurs by means of the re-entrant sections, and since shrinkage for the purpose of adaptation can hardly occur, the area along the narrow slots are particularly endangered. A further disadvantageous is that, as a result of the limited shrinkgage condition, only a relatively small range of cable diameters can he covered by one cable outlet. The seal of the longitudinal slots along the entrance socket thus requires extreme care. In addition, in the assembly of such a sleeve outlet, a number of loose individual parts are to be introduced as fastening elements with which a mechanical support occurs in the introduction area.

These difficulties are avoided by means of a further development of the present invention which proceeds from the cable sleeve which is formed of a longitudinally divided sleeve and has a cable entrance socket with a sealing element for introduction of cables being disposed at an end face so that the socket and the sealing or liner element consist of shrinking material. The sealing element is characterized in that it is designed as a liner element which in its shrunken state only fills the triangular shaped areas or gore areas between the introduced cables and rests there against the inside circumferential areas of the cables and in that the outer circumferential areas of the cables, which remain outside the liner elements are surrounded by the socket. In this case, since a stretching or expansion of the sealing element designed as a liner element need not occur as is however the case given a narrow slot of the known sleeve outlet, the insertion of cables causes no difficulties. It is in this shrunken state namely that the liner element according to the present invention essentially fills only the triangular area between the introduced cables. Such a triangular or gore area filled by the liner element is laterally limited by the respective circumferential sections of a cable and is most advantageously limited by the wall of the socket which for instance forms a connection tangent between two or more cables. However, it is advantageous that the traverse side walls of the liner element, which are supported against the surrounding sockets, be executed deviating somewhat from the straight connection tangent, and have a slight arc in order, by so doing, to obtain a better matching form with respect to the wall of the socket. Such a completely assembled arrangement can be easily derived as illustrated in FIG. 1, where two cables with different diameters are introduced.

In this embodiment the cross-sectional shape of the side walls such as 7 and 8 of the liner element 3 have a C-shaped profile which is opening outward from each other or opens opposite to one another and are interconnected by two inclined connecting traverse side walls 9 and 10. As can be seen in the illustration, the liner only partially surrounds the cables 6 and 6a and the two traverse side walls 9 and 10 of the liner 3 respectively approximately follow the course of the connecting tangents between the two cables 6 and 6a. The circumferential areas of the cables 6 and 6a, which are not covered by the liner, are finally surrounded by the wall forming the entrance socket 1 which rests directly against the remaining surfaces of the cables. Moreover, the liner element can be provided with a support body 5 in its inner cavity 4, which is illustrated as being introduced as a single-piece, double-T-shaped piece and which can serve on the one hand, as a mechanical support and, on the other hand, as a thermal-conduction element for the uniform heat distribution during the shrinkage process.

In contrast to the known support shells, which are annularly surrounded in the overall sleeve outlet, the support bodies according to the present invention are provided only in the triangular area between the cables. By so doing, it guarantees that the shrinkage forces of the wall of the socket can directly influence the remaining circumferential areas of the cables. The support bodies in the invention only prevent the traverse side walls of the liner from being pressed inward into the triangular or gore area during the shrinking process. A retraction of the edge or, respectively, lip of the liner element due to the shrinkage forces is thereby also avoided.

The support body can also be designed as simple plates which are respectively inserted parallel to the traverse side walls such as 9 and 10 and extend between the corners thereof. Thus, the central portion connecting the two heads of the double T would be eliminated. By so doing, it guarantees that the corners of the liner element can likewise not be reformed during the shrinkage process. Thus, a transition between the liner element and the introduced cables, which is of sufficient quality is likewise given. These plates can already be contained in the liner elements so that additional assembly is eliminated. By utilizing relatively flexible plates, there is also provided the advantage that the element can be shaped within wide limits due to the influence of the shrinking forces so that the adaptability of the liner element is hardly inhihited.

The liner element according to the present invention can also have the terminating wall, which serves as an end face termination of the cables sleeve and extends at right angles to the direction of introduction, be disposed inside of the liner element instead of at one end. With this design, the terminating wall can also extend obliquely or be designed in a manner of a bulge in order to have a small effect as possible on the deformability of the liner element during the shrinking process. In the assembled state, this "central wall", however, produces an additional support to the mechanical stability without requiring any additional support means.

In addition, the liner elements according to the present invention can also be used for introduction of a plurality of cables within one recess of the element. It is also possible that these liner elements will provide introduction combinations with which a multitude of cables can be introduced at the end of the cable sleeve as is required for example in a distribution sleeve. This introduction combination can be constructed by means of a single liner element or by means of a plurality of liner elements (see FIGS. 15 and 16) with an engagement of the C-shaped recesses of the liner elements which are finally surrounded by the wall of the entrance socket. The cables lying inside such an introduction combination of elements are then only surrounded, for example, by the liner elements themselves or, respectively, by partial areas of the liner elements, whereas the cables lying on the outside are again only partially seized by the walls of the liner elements and are partially seized by the surrounding wall of the socket which is fixed as is the case in the simple embodiment already described. Thus, given an embodiment of a single liner element, multiple introductions for cable sleeves can be obtained when the elements assume an approximate star or approximately round shape. The shrinkable entrance socket is then pulled over such a multiple introduction and the mutually adaptation occurs in the subsequent shrinkage process until the complete seal is finally achieved.

Figure 15:
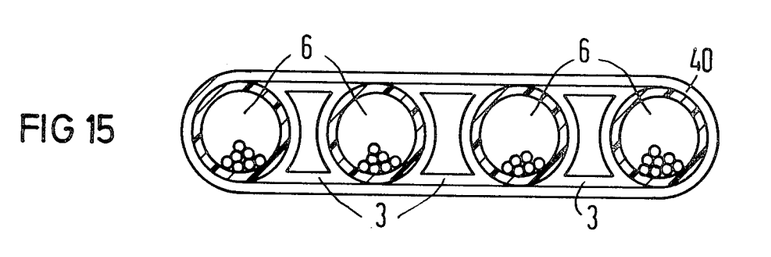
FIG. 15 is an end view of a socket with cables aligned in a row using the liner elements of the present invention.
Figure 16:
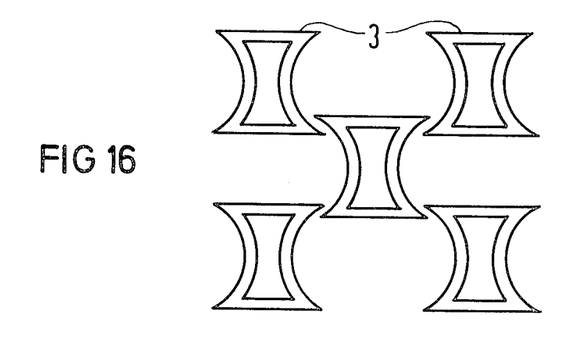
FIG. 16 is an arrangement of the liner elements for handling a bunch of cables.

As shown in FIG. 15, a plurality of liner elements 3 are arranged in a row with the cables 6 in a socket of the cable sleeve. If a bundle of cables are to be inserted in the socket, then the liner elements 3 may be arranged as illustrated in FIG. 16 with their longitudinal edges engaged.

Although various minor modifications may be suggested by those versed in the art, it should be understood that we wish to embody within the scope of the patent granted hereon, all such modifications as reasonably and properly come within the scope of our contribution to the art.

We claim:

1. In a cable sleeve having a longitudinally extending joint and a cable entrance socket at each end of the sleeve, said cable entrance socket consisting of a shrinkable material and receiving a liner element having an axis and having external axially extending recesses for receiving portions of the cables being introduced into the cable entrance socket, and said socket having sealing material for forming a seal between the material of the socket and sheath of the cable engaged by the cable entrance socket, the improvements comprising the liner element consisting of a thermo-plastic, cross-linked material, said element having a shape memory and being shrinkable toward a previous shape when subjected to a shrinking process.

2. In a cable sleeve according to claim 1, wherein the shape memory for the liner element is such that the recesses will shrink onto portions of the cables introduced therein during the shrinking process and wherein the element is heat shrinkable.

3. In a cable sleeve according to claim 1, wherein the liner element comprises a solid member, said solid member having a shape memory and being heat shrinkable so that the liner element will return to the previous shape during a heat shrinking process.

4. In a cable sleeve according to claim 3, wherein the solid member is formed of a foam material.

5. In a cable sleeve according to claim 1, wherein the liner element comprises a hollow element having at least one side wall extending in the axial direction and being interconnected by a transverse terminating wall extending at substantially right angles to the axial direction to form at least one cup, said side wall being shaped to provide the recesses.

6. In a cable sleeve according to claim 5, wherein the liner element has a pair of side walls each having a recess interconnected by traverse side walls, said side walls with recesses having a cross-section resembling a pair of C-profiles opening opposite to each other with the sides of the C-profiles being interconnected by the traverse side walls.

7. In a cable sleeve according to claim 6, wherein the surfaces of the traverse side walls extend substantially parallel to one another.

8. In a cable sleeve according to claim 6, wherein the traverse side walls are inclined to each other in a direction at right angles to the axial direction.

9. In a cable sleeve according to claim 6, wherein each of the traverse side wall portions have an arcuate cross-section.

10. In a cable sleeve according to claim 6, wherein the liner element have internal bracings extending between the insides of the transverse side wall and the side walls having the C-shaped profile.

11. In a cable sleeve according to claim 5, wherein the liner element has at least three side walls with a cross-sectional shape of C-shaped profiles being arranged to open outward from one another with traverse side walls interconnecting the sides of the C-shaped profile.

12. In a cable sleeve according to claim 5, wherein the liner element has at least three side walls with recesses being arranged around the axis of the liner element to create a star-like cross-sectional shape.

13. In a cable sleeve according to claim 1, wherein each of the recesses has a coating of a plastic adhesive sealing material.

14. In a cable sleeve according to claim 13, wherein the outer surface of the element adjacent said recesses also has a coating of a plastic adhesive sealing material.

15. In a cable sleeve according to claim 1, wherein the outer surfaces of the recesses have coatings of a meltable adhesive.

16. In a cable sleeve according to claim 1, wherein the outer surfaces of the liner element adjacent the recesses have a coating of a meltable adhesive.

17. In a cable sleeve according to claim 1, wherein the outer surfaces of the liner element are provided with axially spaced coatings of a meltable adhesive and an adhesive sealing material so that in the axial direction one goes from one type to the other type of adhesive.

18. In a cable sleeve according to claim 1, wherein the liner elements includes a heat conducting element.

19. In a cable sleeve according to claim 1, wherein at least one of the recesses receives a plug in place of a cable.

20. In a cable sleeve according to claim 1, wherein the material of the cable entrance socket and the liner element are both heat shrinkable materials, and are identical in their behavior with respect to a temperature of the heat shrinking process.

21. In a cable sleeve according to claim 1, wherein the materials of the cable entrance socket and the liner element are each heat shrinkable materials and having different shrinkage behaviors concerning a given temperature.

22. In a cable sleeve according to claim 1, wherein the cable entrance socket is provided with a meltable coating of adhesive and the liner element is provided with a coating of a meltable adhesive, said adhesives melting in different temperature ranges.

23. In a cable sleeve according to claim 1, wherein the liner element is a substantially hollow element having axially extending side walls, with a side wall being curved to form each of said recesses and side walls being interconnected by a terminating wall extending transverse to the axial extending side walls to form an internal cavity and said lining element including a support element received inside of the cavity.

24. In a cable sleeve having a longitudinally extending joint and a cable entrance socket at each end of the sleeve for the introduction of cables into the interior of the sleeve, each socket receiving a sealing element for sealing the space between the cables inserted therein, said socket and sealing element being of a heat shrinkable material the improvements comprising the sealing element being a hollow liner element having at least three interconnected axially extending side walls and being interconnected by a transverse terminating wall extending at substantially right angles to said axial direction to form at least one cup-shaped cavity, some of said side walls being shaped to provide an axial extending outwardly opening recess for each of the cables, said hollow cupshaped liner element being a thermoplastic, cross-linked material, having a shape memory and being heat shrinkable to the previous shape when subjected to a heat shrinking process.

25. In a cable sleeve according to claim 24, wherein said liner element exhibits tapering projections adjacent each of said recesses, said tapering projection when in the shrunken state bridging the transition between the liner element, cable and socket without gradations.

26. In a cable sleeve according to claim 24, which includes sealing material being disposed between the cables, and the liner element as well as between the shrunken socket and the cables.

27. In a cable sleeve according to claim 24, where the liner element fills the triangular areas between the introduced cables and the shrunken socket.

28. In a cable sleeve according to claim 27, wherein the shrunken socket extending along a common tangent connecting two adjacent cables and wherein the liner element has a portion assuming the shape of said common tangent.

29. In a cable sleeve according to claim 24, wherein the side wall containing recesses are connected along the edges by traverse side walls, said traverse side walls having a curved arcuate surface approaching an arc-like tangent extending between the two cables.

30. In a cable sleeve according to claim 24, wherein the transverse terminating wall of the liner element has means for forming an opening for receiving an element extending into the interior of the cable sleeve.

31. In a cable sleeve according to claim 24, wherein the terminating transverse wall is located inward of the ends of the liner element so that a pair of cup-shaped cavities are formed.

32. In a cable sleeve according to claim 24, wherein the transverse terminating wall is positioned adjacent an axial end of the liner elements so that only a single cup-shaped cavity is formed.

33. In a cable sleeve according to claim 24, wherein a plurality of liner elements are packed together to form the sealing elements.

34. In a cable sleeve according to claim 33, wherein the liner elements are disposed to extend parallel to each other.

35. In a cable sleeve according to claim 34, where the plurality of liner elements are disposed to engage with one another with their longitudinal edges.

36. An initial part for manufacturing a liner element for a cable sleeve, said liner part being utilized in a cable introduction socket to seal at least two cables in said socket, said part being a hollow member of a thermoplastic material being capable of being cross-linked to retain a shape memory, said hollow member having axially extending side walls and a terminating wall extending transverse to the axial direction to form at least one cup shape cavity.

37. An initial part according to claim 36, wherein said part has a rectangular cross-sectional form.

38. An initial part according to claim 36, wherein the part has an essentially rectangular cross-section with each corner being provided with a lip, said lips being arranged in pairs of projecting lips, with each pair of lips and the respective side wall therebetween forming a type of groove subsequently deformable into a recess.

39. An initial part according to claim 36, wherein said part has a triangular cross-sectional form.

40. An initial part according to claim 36, wherein the initial part exhibits an approximate triangular cross-sectional form with the three major side walls being interconnected by a smaller traverse side wall, each of said major side walls having a substantially C-shaped cross-sectional configuration opening outward, said traverse extending side walls and major side walls merging with triangular shaped lips.

* * * * *